(12) United States Patent  (10) Patent No.: US 9,346,679 B2
Parsapour  (45) Date of Patent: May 24, 2016

(54) METHOD FOR ENHANCING GROWTH OF CARBON NANOTUBES

(75) Inventor: Farzad Parsapour, Bartlett, TN (US)

(73) Assignee: BROTHER INTERNATIONAL CORPORATION, Bridgewater, NJ (US)

( * ) Notice: Subject to any disclaimer, the term of this patent is extended or adjusted under 35 U.S.C. 154(b) by 660 days.

(21) Appl. No.: 12/251,228

(22) Filed: Oct. 14, 2008

(65) Prior Publication Data

US 2010/0092369 A1   Apr. 15, 2010

(51) Int. Cl.
*B06B 1/20* (2006.01)
*C01B 31/02* (2006.01)
*B82Y 30/00* (2011.01)
*B82Y 40/00* (2011.01)

(52) U.S. Cl.
CPC .............. *C01B 31/0233* (2013.01); *B82Y 30/00* (2013.01); *B82Y 40/00* (2013.01); *C01B 2202/08* (2013.01); *C01B 2202/34* (2013.01)

(58) Field of Classification Search
USPC .................................................. 427/600, 601
See application file for complete search history.

(56) References Cited

U.S. PATENT DOCUMENTS

| 6,228,753 | B1 * | 5/2001 | Lo et al. .................. 438/612 |
| 6,256,455 | B1 * | 7/2001 | Chih ....................... 392/441 |
| 6,361,614 | B1 * | 3/2002 | Chung et al. ................ 134/3 |
| 2002/0136844 | A1 * | 9/2002 | Hasegawa et al. ......... 427/600 |
| 2002/0160111 | A1 * | 10/2002 | Sun et al. ................. 427/248.1 |
| 2005/0236963 | A1 * | 10/2005 | Kang et al. ............... 313/495 |
| 2006/0096866 | A1 * | 5/2006 | Ala-Kleme et al. ......... 205/131 |
| 2006/0252251 | A1 * | 11/2006 | Park et al. ................ 438/618 |

FOREIGN PATENT DOCUMENTS

WO    WO 2007053579 A2 *  5/2007

* cited by examiner

*Primary Examiner* — Nathan Empie
(74) *Attorney, Agent, or Firm* — Frommer Lawrence & Haug LLP

(57) ABSTRACT

A method for fabricating a plurality of carbon nanotube structures having enhanced length is disclosed. Several steps are involved in this method. First, a substrate is provided. Next, a non-catalytic metal layer is formed on the substrate. Then, a catalytic metal layer is formed on the non-catalytic metal layer. After that, the catalytic metal layer is subjected to ultrasonication and exposure to water. Finally, the plurality of carbon nanotube structures is formed on the substrate in the presence of the catalytic metal layer. In this embodiment, the ultrasonication and exposure to water step includes submerging the catalytic metal layer in a liquid bath, ultrasonicating the catalytic metal layer and the liquid bath, and exposing the catalytic metal layer to water.

17 Claims, 5 Drawing Sheets

METHOD FOR ENHANCING GROWTH OF CARBON NANOTUBES

BACKGROUND OF THE INVENTION

1. Field of the Invention

This invention provides a method for enhanced growth of carbon nanotubes (CNTs). The specific enhancement manifests itself as a substantial increase in the length of the CNTs under identical catalytic growth via chemical vapor deposition (CVD). The method includes an ultrasonication and exposure to water step which involves (1) immersing the catalyst deposited on the substrate in a bath containing a liquid, such as, for example, an aqueous solution or a non-aqueous solution, (2) subjecting the catalyst/bath system to acoustic waves generated from an ultrasonic apparatus (e.g., sonicator), and (3) exposing the catalyst to water (e.g., via rinsing). Following the ultrasonication and exposure to water step, the CNTs are grown utilizing CVD. Comparison of CNTs grown with the ultrasonication and exposure to water step, and CNTs grown in an identical manner but without the ultrasonication and exposure to water step, reveals a significant increase in the length of the CNTs when the ultrasonication and exposure to water step is included. The range of applications for CNTs with increased length covers gas diffusion layers for fuel cells to thin conductive films.

2. Description of Related Art

Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes by evaporating carbon in an arc discharge. Carbon nanotubes (CNTs) possess certain electronic and mechanical properties, making them candidates for applications relating to composite materials, nano-electronics, sensors, and electron field emitters. CNTs can be utilized individually or as an ensemble to build a variety of devices. For instance, individual nanotubes have been used as tips for scanning probe microscopy and as mechanical nano-tweezers. Ensembles of nanotubes have been used for field emission based flat-panel displays, and it has been suggested that bulk quantities of nanotubes may be used as a high-capacity hydrogen storage media. The electronic behavior of CNTs is closely related to their structure (i.e., tip curvature, radius and composition, nanotube length, and chirality).

Carbon nanotubes have attracted much attention due to their unique physical properties. These properties range from efficient electron field emission to immense surface to volume ratio suitable for catalytic processes and high electrical conductivity suitable for thin film-based devices. For some applications such as field emission, exact control of the size, length and position of the nanotube may be critical. Other applications (e.g., thin films, catalysis, composite materials) require carbon nanotubes of good size uniformity and substantial length. One example of a method of generating carbon nanotubes involves catalytic growth via chemical vapor deposition (CVD). To this end, researchers have sought ways to increase the length of CVD-based nanotubes and nanotube bundles.

The length of the nanotube is limited by the deposition parameters as well as catalyst-poisoning phenomenon. One method has utilized introduction of water vapor along with the reactant gases during the chemical vapor deposition process, which resulted in growth of nanotubes with considerable length. However, the above-mentioned method is complicated by the requirements of very precise control of the water vapor pressure, and the costly additions to a conventional CVD apparatus necessary to properly control the introduction of water vapor during the CVD process.

Therefore, a need has arisen for an alternative simple method of generating long nanotubes which avoids the complications discussed above.

SUMMARY OF THE INVENTION

In accordance with one embodiment of the invention, a method for fabricating a plurality of carbon nanotube structures having enhanced length is disclosed. Several steps are involved in this method. First, a substrate is provided. Next, a non-catalytic metal layer is formed on the substrate. Then, a catalytic metal layer is formed on the non-catalytic metal layer. After that, the catalytic metal layer is subjected to ultrasonication and exposure to water. Finally, the plurality of carbon nanotube structures is formed on the substrate in the presence of the catalytic metal layer. In this embodiment, the ultrasonication and exposure to water step includes submerging the catalytic metal layer in a liquid bath, ultrasonicating the catalytic metal layer and the liquid bath, and exposing the catalytic metal layer to water.

Pursuant to yet another embodiment of the invention, a method for fabricating a plurality of carbon nanotube structures having enhanced length is disclosed. Several steps are involved in this method. First, a substrate is provided. Next, a non-catalytic metal layer is formed on the substrate. Then, a catalytic metal layer pad forming step is performed. After that, the resistant material remaining after the catalytic metal layer pad forming step is removed. Finally, the catalytic metal layer is subjected to ultrasonication and exposure to water. In this embodiment, the catalytic metal layer pad forming step includes several sub-steps. First, a layer of a resist material is deposited on the non-catalytic metal layer. Next, the resist layer is patterned. Then, according to the pattern, a portion of the resist layer is removed from the underlying catalytic metal layer so as to expose a portion of the non-catalytic metal layer. Finally, a catalytic metal layer is formed on the exposed portion of the non-catalytic metal layer. In this embodiment, the ultrasonication and exposure to water step includes submerging the catalytic metal layer in a liquid bath, ultrasonicating the catalytic metal layer and the liquid bath, and exposing the catalytic metal layer to water. In addition, the ultrasonication and exposure to water step occurs after the catalytic metal layer pad forming step.

In accordance with another embodiment of the invention, a method for fabricating a plurality of carbon nanotube structures having enhanced length is provided. This method includes providing a substrate and performing a catalytic metal layer pad forming step. In this embodiment, the catalytic metal layer pad forming step involves several sub-steps. First, a layer of a resist material is deposited on the substrate. Next, the resist layer is patterned. Then, according to the pattern, a portion of the resist layer is removed from the underlying substrate so as to expose a portion of the substrate. After that, a non-catalytic metal layer is formed on the exposed portion of the substrate. Finally, a catalytic metal layer on the non-catalytic metal layer is formed. In this embodiment, the resistant material remaining after the catalytic metal layer pad forming step is removed. In addition, the catalytic metal layer is subjected to an ultrasonication and exposure to water step. This ultrasonication and exposure to water step includes submerging the catalytic metal layer in a liquid bath, ultrasonicating the catalytic metal layer and the liquid bath, and exposing the catalytic metal layer to water.

Further, the ultrasonication and exposure to water step occurs after the catalytic metal layer pad forming step.

DETAILED DESCRIPTION OF EMBODIMENTS

Figure 1A:
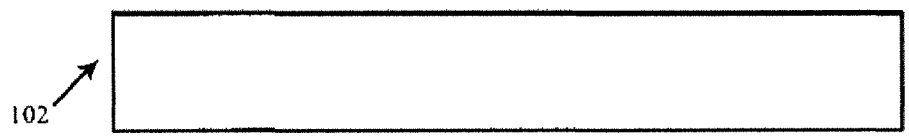
FIGS. 1A-1D illustrate steps in part of a first embodiment of a process for the formation of a carbon nanotube array with a plurality of CNT structures.
Figure 1B:
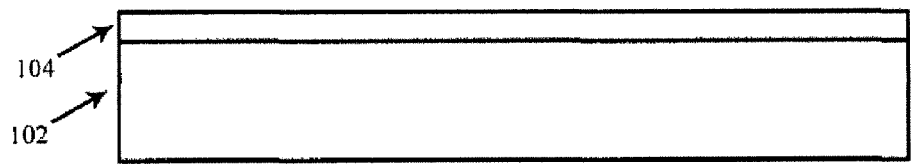
Figure 1C:
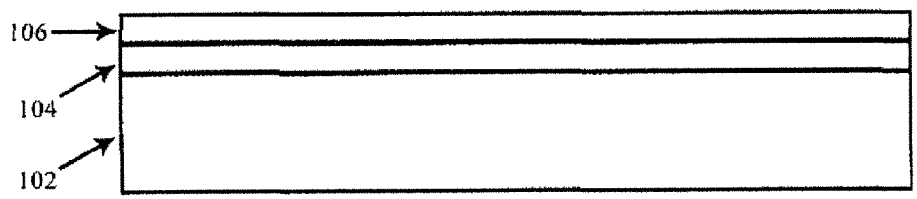
Figure 1D:
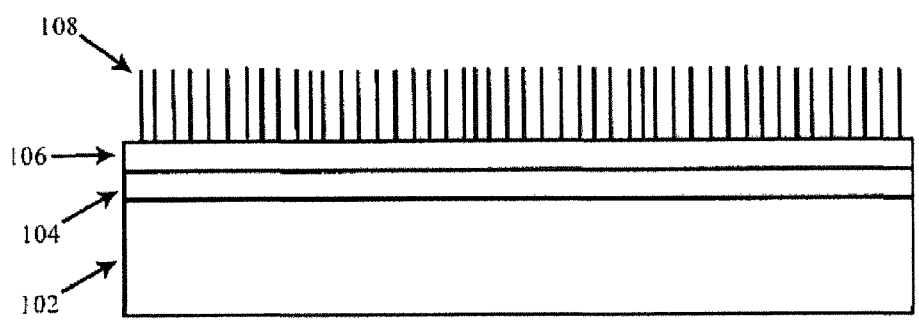
Figure 2A:
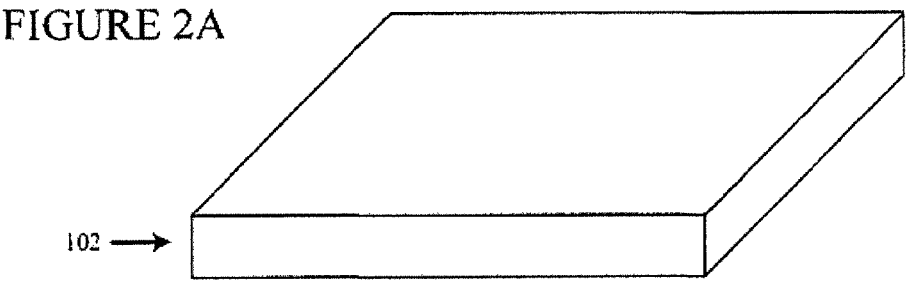
FIGS. 2A-2G illustrate steps in part of a second embodiment of a process for the formation of a carbon nanotube array with a plurality of CNT structures, wherein the array is further patterned with lithographic methods.
Figure 2B:
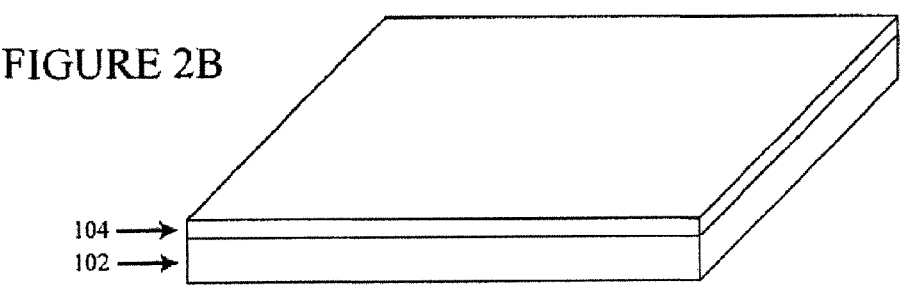
Figure 2C:
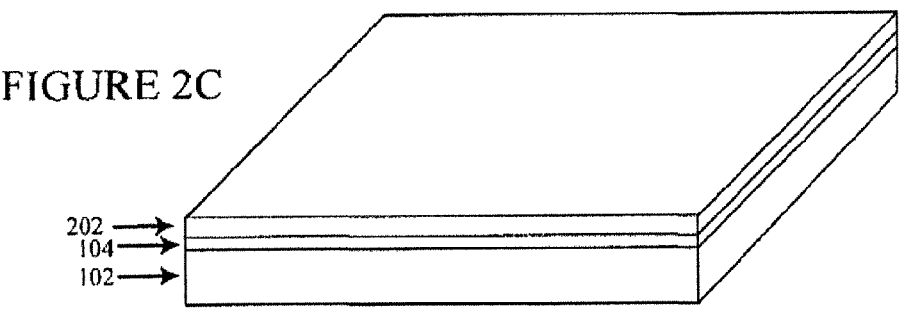
Figure 2D:
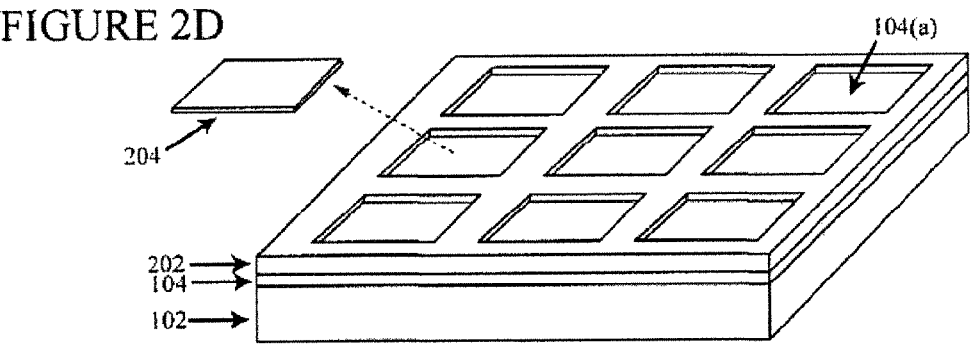
Figure 2E:
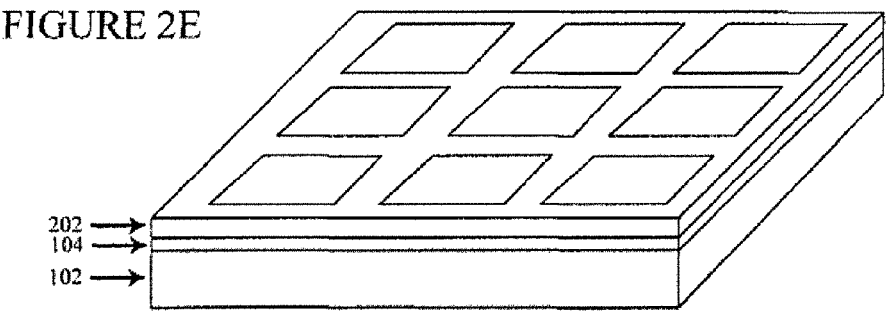
Figure 2F:
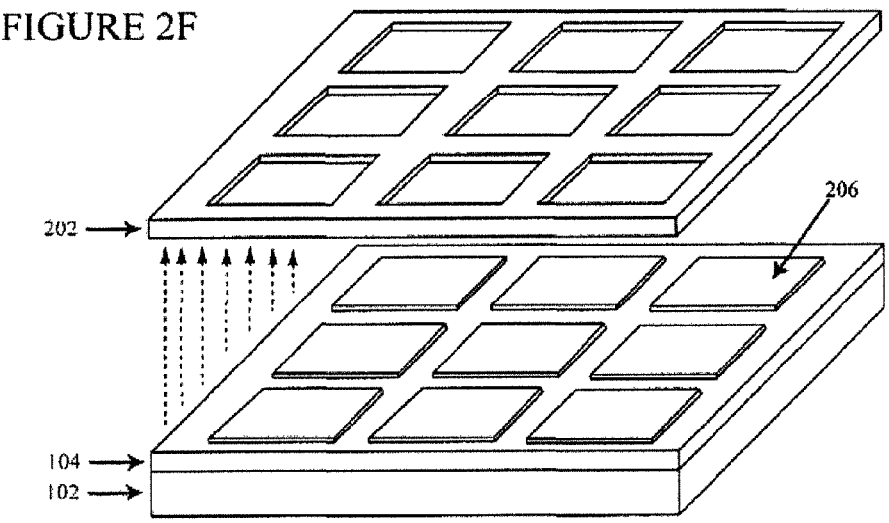
Figure 2G:
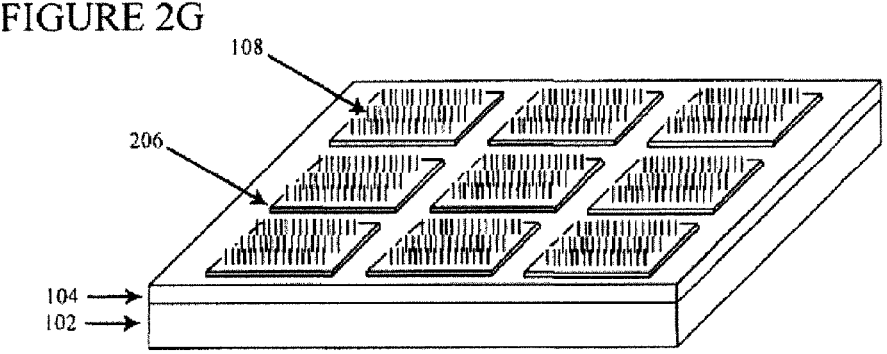

It is to be understood that the figures and descriptions of the present invention have been simplified to illustrate elements that are relevant for a clear understanding of the present invention, while eliminating, for purposes of clarity, many other elements found in conventional CNT fabrication methods. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Carbon nanotubes are typically produced by methods such as arc-discharge, laser ablation, or chemical vapor deposition (CVD). The first two methods rely on evaporating carbon atoms from solid carbon sources at a very high temperature. The CVD process involves heating a catalyst material to a high temperature in a reactor and flowing a hydrocarbon gas through the reactor for a period of time. Several parameters in nanotube CVD growth include the hydrocarbon species in the gas, the catalyst, and the reaction temperature.

One example of a method of generating carbon nanotubes on a surface involves catalytic growth via chemical vapor deposition (CVD). A catalyst layer is evaporated or sputtered on a substrate, the substrate is loaded into a reaction chamber, and feed gas is introduced at elevated temperatures. Preferably, decomposition of the feed gas occurs only at the catalyst sites, thus reducing amorphous carbon generated in the process. Decomposed carbon molecules assemble into nanotubes at the catalyst nanoparticle sites. Advantageously, catalyst nanoparticles can be patterned on a substrate lithographically to realize nanotube growth at intentional locations. For example, the growth of nanotubes can be caused to originate at a site of electrical connections or of mechanical significance.

The invention provides a method for enhanced growth of CNTs, substantially increasing the length of CNTs fabricated under the same CVD growth conditions. This is achieved through the utilization of an ultrasonication and exposure to water step, prior to initiating the growth process. The addition of this ultrasonication and exposure to water step results in an increase by a factor of 5-15 in the length of the nanotubes, compared to the conventional CVD method, based on the time scale of the ultrasonication step. Although not wishing to be bound by any particular theory, it is believed the mechanism may involve generation of micro-defects or cavities in the catalyst layer during ultrasonication, providing a residence for water molecules during the growth process. Immersion of the catalyst-deposited substrate in water alone, without ultrasonication, does not result in any enhancement compared to the conventional growth method.

One embodiment of the present invention provides a method for the preparation of carbon nanotube (CNT) arrays. As shown in FIGS. 1A-D, the method involves the deposition of an interlayer 104 (e.g., a chromium interlayer) onto a substrate 102; followed by the deposition of an outerlayer 106 (e.g., an iron catalyst) onto the interlayer 104.

After the deposition of the outerlayer 106 onto the interlayer 104, the outerlayer 106 is then subjected to an ultrasonication and exposure to water step. This ultrasonication and exposure to water step includes submerging the outerlayer 106 in a bath containing a liquid. The liquid can be an aqueous solution or a non-aqueous solution. Example of an acceptable liquids includes a dimethyl sulfoxide (DMSO), water, alcohols, and solutions thereof. The bath and outerlayer 106 are then subjected to ultrasonication (i.e., acoustic waves generated from an ultrasonic apparatus). After the outerlayer 106 is removed from the bath following completion of the ultrasonication, the outerlayer 106 is exposed to water. Examples of processes of exposing the outerlayer 106 to water include rinsing, spraying, and dipping, to name a few.

In the above ultrasonication and exposure to water step, the outerlayer 106 is first subjected to ultrasonication and then exposed to water. However, the current invention is not limited thereto. For example, the outerlayer 106 can be exposed to water and then subjected to ultrasonication. Another example involves using water as the solution in which the outerlayer 106 is ultrasonicated, thereby simultaneously ultrasonicating the outerlayer 106 and contacting it with water. Yet another example involves ultrasonicating the outerlayer 106 in an aqueous solution.

Following the ultrasonication and exposure to water step, the CNTs are grown by subjecting the substrate 102/interlayer 104/outerlayer 106 combination to CVD. The CNTs of the present invention are formed on the substrate at the catalyst sites using any suitable carbon nanotube formation technique including, but not limited to, chemical vapor deposition (CVD) techniques.

The term "carbon nanotube" refers to a hollow cylindrical article composed primarily of carbon atoms. For example, the nanotubes can have a narrow dimension (diameter) of about 1-200 nm and a long dimension (length), where the ratio of the long dimension to the narrow dimension (i.e., the aspect ratio) is at least 5. In many CNTs, the aspect ratio is between 100 and 2000, and in exemplary cases, the aspect ratio can be in excess of 100000. The carbon nanotubes of the invention can be either multi-walled nanotubes (MWNTs) or single-walled nanotubes (SWNTs). An MWNT, for example, includes several concentric nanotubes each having a different diameter. Thus, the smallest diameter tube is encapsulated by a larger diameter tube, which in turn, is encapsulated by another larger diameter nanotube. An SWNT, on the other hand, includes only one nanotube.

The term "substrate", as used herein, refers to the structure upon which the nanotube is disposed. In many instances, the substrate provides the mechanical support for the CNT. The substrate can be, for example, a single crystal, polycrystalline, glassy, or amorphous material whose surface is the surface on which the nanotubes are deposited or grown. The substrate can comprise one or more layers that may be structured to form an electronic architecture. In particular, an architecture may be constructed which allows each CNT structure of an array of CNT structures to be separately addressable electrically. The substrate can also contain a pattern which is either uniform or non-uniform. The pattern may include contacts formed and leading to the CNT structures. That is, the substrate may include a plurality of current paths on the substrate, each coupled electrically to a respective one or more of the CNT structures. The substrate is not comprised of materials that are reactive with the nanotubes, with any material used in the process for their preparation, or with intermediates formed during the process.

In a preferred embodiment of the present invention, the substrate is made of semiconductor material such as Si or n-doped silicon, or an insulating material such as silica, glass, alumina, quartz, ceramic materials, mica, a synthetic resin, or graphite. Especially preferred in the practice of the present invention is n-doped Si in the form of a Si wafer.

The term "non-catalytic metal", as used herein, refers to any metal or metal complex which has negligible catalytic activity toward CNT growth when placed in the reaction chamber in the presence of the particular reaction gases and under the particular reaction conditions. Noncatalytic metals that are acceptable for the practice of the present invention include, for example, transition metals, transition metal complexes, or transition metal alloys that provide negligible catalytic activity at the substrate surface. The non-catalytic metal may provide for improved adherence of the photoresist to the substrate so as to prevent photoresist lift-off during, inter alia, lithographic techniques and resist etching.

In a preferred embodiment, the non-catalytic metal is selected from the group consisting of Cr, Al, Ga, In, Sn, Pb, and complexes or alloys thereof. A particularly preferred non-catalytic metal for the practice of the present invention is metallic chromium.

The term "interlayer", as used herein, refers to a non-catalytic layer that is deposited on the surface of the substrate. The non-catalytic interlayer may be formed onto the surface of the substrate using any suitable technique including, but not limited to, chemical vapor deposition and physical vapor deposition methods known in the art including, but not limited to, e-beam evaporation and sputtering. In one embodiment, the non-catalytic interlayer is deposited on the substrate surface at a rate of from about 0.1 to about 0.5 nm/s, and has a thickness ranging from about 0.6 nm to about 2.0 nm.

The terms "catalyst", "catalytic metal", and "metal catalyst", as used herein, are synonymous, and refer to any material that catalyzes the reaction of the carbon-containing feedstock to carbon nanotubes (e.g., a transition metal). Catalytic metals that are suitable for the practice of the method invention include, for example, any transition metal, transition metal complex, or transition metal alloy that, when exposed to the reaction chamber and feed gasses, aids in the formation of carbon nanotube structures on the substrate. The catalyst can be deposited on the surface of the non-catalytic interlayer in the form of the active catalyst or in the form of a pre-catalyst. The pre-catalyst is a metal containing material that when treated, for example, by exposure to the high temperatures of the reaction chamber, is converted to an active catalyst capable of promoting CNT growth on the substrate.

In a preferred embodiment of the present invention, the catalyst is a transition metal selected from the group consisting of Fe, Co, Ni, Mo, Pd, and Pt, and complexes and alloys thereof. A particularly preferred metal catalyst for the practice of the present invention is metallic Fe.

The terms "overlayer" and "outerlayer", as used herein, are synonymous and refer to the catalyst layer that is deposited on the surface of the non-catalytic interlayer. The catalyst overlayer may be formed onto the surface of the interlayer using any suitable technique including, for example, chemical vapor deposition and physical vapor deposition methods known in the art including, but not limited to, e-beam evaporation and sputtering. In one embodiment, the catalyst overlayer is deposited on the interlayer surface at a rate of from about 0.1 to about 0.5 nm/s, and has a thickness preferably ranging from about 1.0 nm to about 5.5 nm.

It is also noted that the metal catalyst does not necessarily need to be deposited using physical vapor deposition techniques, although this is preferred. For example, catalyst materials can be deposited as metal salts dissolved in a carrier solvent. The solvent is then deposited on the interlayer and allowed to dry, leaving the metal salt. The metal salt may then need to be "activated" by exposing it to high temperature so that it decomposes into active catalyst material.

In a preferred embodiment, the interlayer is deposited on the surface of the substrate and the overlayer is deposited on the surface of the interlayer using an e-beam evaporator apparatus. In one embodiment, the thickness of the interlayer upon deposition using the e-beam evaporator is preferably from about 1.4 to about 1.8 nm. The thickness of the catalyst overlayer upon deposition using the e-beam evaporator is preferably from about 2.5 to about 2.9 nm.

The terms "ratio of thickness" and "thickness ratio", as used herein, are synonymous and refer to the ratio of thickness of the non-catalytic metal interlayer to the thickness of the catalytic overlayer. In at least some instances, the variation in thickness of the non-catalytic interlayer results in a variation in population density of CNT at constant catalytic layer thickness, with lower density for thicker non-catalytic layers. In these instances, by adjusting the thickness of the overlayer and interlayer and the thickness ratio, the site-density of the CNT arrays may be controlled. For example, the thickness ratio non-catalytic metal interlayer to the catalytic overlayer can be from about 1:1 to about 1:8, preferably from about 1:3 to about 2:3.

The terms "sonicator" and "ultrasonicator", as used herein, are synonymous and refer to a device which subjects a given system to ultrasonic energy so as to agitate the particles in the system. Similarly, the terms "sonicating" and "ultrasonicating", as used herein, are synonymous and refer to the act of using an ultrasonicator to subject a given system to ultrasonic energy so as to agitate the particles in the system.

The term "reaction chamber", as used herein, refers to any apparatus that provides the reaction conditions for the growth of nanotube structures. In one embodiment of the present invention, the reaction chamber is a chemical vapor deposition (CVD) apparatus. In one example of a CVD process, gaseous mixtures of chemicals are dissociated at high temperature (for example, $CO_2$ into C and $O_2$) and some of the liberated molecules may then be deposited on a nearby substrate, with the rest pumped away. With regard to the growth of CNTs, the CVD apparatus provides an atmosphere of a source gas that provides the carbon atoms necessary for CNT growth. The CVD apparatus may also provide a promoter gas and a diluent gas to allow for an enhancement of the purity of the nanotubes grown. Examples of CVD methods include but not limited to thermal CVD, plasma enhanced CVD (PECVD), hot filament CVD (HFCVD), and synchrotron radiation CVD (SRCVD). In a preferred embodiment of the present invention the CVD apparatus is a thermal CVD apparatus.

A thermal CVD apparatus is typically heated to high temperature (e.g., from about 650 to about 1100° C.) to allow for the thermal decomposition of a source gas. Examples of growing nanotubes are discussed below. It will be recognized, however, that there are many methods of making carbon nanotubes and these methods are, in general, suitable for use in the present invention. The source gas of the present invention can be, for example, a saturated or unsaturated; linear, branched, or cyclic hydrocarbon, or mixture of hydrocarbons, that are in the gas or vapor phase at the temperatures at which they are contacted with the catalyst substrate material (reaction temperature). Other exemplary carbon-containing gases include carbon monoxide, oxygenated hydrocarbons (e.g., acetone and methanol), aromatic hydrocarbons (e.g., toluene, benzene and naphthalene), and mixtures of the above. A rate of deposition of carbon on the catalyst material at elevated temperatures will depend on factors including the partial pressures of the carbon-containing gases. Preferred carbon source gases include methane, propane, acetylene, ethylene, benzene, or mixtures thereof. In an especially preferred embodiment, the carbon source gas for the synthesis of low to medium-site density CNTs is ethylene.

The promoter gas is a substance that is a gaseous compound at the reaction temperatures, and preferably comprises a non-carbon gas such as hydrogen, ammonia, ammonia-nitrogen, thiophene, or mixtures thereof. The promoter gas may be useful to reduce the formation of unwanted allotropes of carbon, such as graphite, and the deposition of such materials on the substrate surface. The promoter gas of the present invention may be diluted by mixing it with a diluent gas, which are primarily unreactive, oxygen-free gases, such as for example, helium, nitrogen, argon, neon, krypton, xenon, hydrogen sulfide, or combinations thereof. For the CVD reaction process of the present invention, hydrogen is preferred for reaction temperatures maintained at less than about 720° C., while for higher temperatures (greater than or equal to about 720° C.), the promoter gas is chosen from ammonia, hydrogen, nitrogen, or any combination thereof. The promoter gas can be introduced into the reaction chamber (e.g., a thermal CVD apparatus) at any stage of the reaction process. Preferably, the promoter gas is introduced into the reaction chamber either prior to or simultaneously with the carbon source gas. In a preferred embodiment, the promoter gas is hydrogen and the diluent gas is argon.

The methods of the present invention can yield either multi-walled or single-walled nanotubes. For promoting multi-walled carbon nanotube growth, exemplary CVD methods employ a growth temperature typically in the range of 650-800° C. with ethylene as the carbon-containing gas. Carbon-containing gases for promoting the growth of single-walled carbon nanotubes include methane, ethylene, acetylene, and carbon monoxide. SWNT are usually grown at a temperature in the range of 900-1100° C.

The methods of the present invention can provide carbon nanotube arrays wherein the growth of each individual nanotube is either catalyzed from the base of the nanotube, or is catalyzed from the tip of the nanotube. If the mechanism of nanotube growth occurs from the base of the nanotube (catalysis at the catalyst overlayer surface), the nanotube structure will likely be attached to the surface of the catalyst overlayer. However, if the mechanism of nanotube growth occurs from the tip of the nanotube (catalysis distal from the catalyst overlayer surface), the nanotube structure will likely be attached to the surface of the substrate. Depending on nanotube catalysis factors such as, for example, the identity of the interlayer and/or overlayer (i.e., choice of metals), interlayer and over layer thickness, growth conditions (e.g., furnace temperature, reaction time), the nanotubes can be grown from the nanotube base, from the nanotube tip, or both. In certain embodiments of the present invention the CNT structures will be formed over the exposed surface of the catalytic metal layer. Although initial CNT formation occurs, in most cases, at the catalytic metal surface, the point of attachment of the CNT (catalyst surface or substrate surface) will depend on the mechanism or catalysis.

In a preferred embodiment of the present invention, a clean, virgin, n-doped, 2 side polished, Si wafer is loaded into an e-beam evaporator. Chromium (Cr), is evaporated onto the substrate at a rate of 0.1-0.5 nm/s, with a thickness ranging from about 1.4 nm to about 1.8 nm. Following the deposition of the Cr layer, an iron (Fe) catalyst layer is deposited over the Cr layer at a rate of 0.1-0.5 nm/s, with a thickness ranging from about 2.5 nm to about 2.9 nm.

Then, the whole wafer or a wafer piece, including the Fe catalyst layer, is immersed into a liquid bath. Examples of the liquid bath include an aqueous-based solution and a solvent-based solution. The wafer/bath system is then subjected to ultrasonication for a period ranging from 5-40 minutes, following which the wafer is removed from the bath and rinsed thoroughly with deionized (DI) water and dried using an air jet. As stated above, the ultrasonication time period ranges from 5-40 minutes. Preferably, this time period is 7-15 minutes, more preferably 9-11 minutes, and most preferably 10 minutes. The DI water used to rinse the wafer may have a resistivity of, for example, around 18.2 MΩ·cm.

The wafer is then cut into 15×15 mm$^2$ pieces and loaded into a thermal CVD furnace. Argon and an ethylene/hydrogen mixture in a ratio of approximately 1:1 are fed to the furnace at elevated temperatures ranging from about 680 and 720° C. The plurality of CNTs are then grown on the surface of the catalyst for a reaction time of from about 1 to about 60 minutes.

The reaction time in the preferred methods of the invention can be varied depending on the length of the nanotubes desired, with longer times generally resulting in longer nanotubes. In one embodiment, the preferred reaction times utilized in the methods of the present invention are from about 3 to about 25 minutes.

Generally, the diameter and length of the carbon nanotubes will depend, in part, on the process parameters (e.g., temperature, time, ratio of gases, etc.) and gases used in growing the nanotubes. In addition, some nanotube formation techniques grow single-walled nanotubes and others techniques grow multi-walled nanotubes. In one example, multi-walled carbon nanotubes were grown at 700° C. for 25 minutes on a silicon substrate with iron catalyst layer. Different mixtures of gases were used including a mixture containing 100 sccm (standard cubic centimeters per minute) hydrogen and 690 sccm ethylene and a second mixture containing 400 sccm hydrogen, 400 sccm ethylene, and 400 sccm argon.

In a preferred embodiment, the average diameter of the CNTs in the arrays fabricated using the methods of the present invention is from about 10 nm to about 40 nm.

Thus, through the control of both the average height and average diameter of the CNTs grown from the methods described herein, arrays of CNTs can be fabricated with the large aspect ratios necessary for electronic applications (e.g., interconnect devices, microelectronics, etc.), energy storage applications (e.g., diffusion layer for Direct Methanol Fuel Cells ("DMFC")), and thin film applications (e.g., transparent conductive films).

The terms "array" and "CNT array", as used herein, are synonymous and refer to a plurality of CNT tubules that are attached to the substrate material proximally to one another. For the purposes of the various embodiments of this invention, the CNT array comprises the substrate, the interlayer material, the outerlayer catalyst material, and the plurality of CNT structures grown thereon.

In a further embodiment of the present invention lies a method for forming patterns of CNTs on the substrate using lithographic methods. The lithographic methods described herein provide for the precise placement and patterning of catalytic sites onto the surface of the substrate. Thus, the CNT arrays fabricated using the methods herein can be grown in alignment with, inter alia, current paths on the substrate.

The terms "resist" and "resist material", as used herein, are to be understood to encompass any material suitable to protect an underlying surface during a process treatment. Thus, a resist may be any organic or inorganic chemical substance or compound which can be blanketdeposited and patterned for feature definition. Both positive and negative resists can be used. The resist can have process selectivity relative to the underlying material, such as significantly differing etch-rates, or it may act as a shielding element, for instance, to protect the underlying surface from material deposition or ion bombardment. In one embodiment, resist development produces a negative pattern of pads with pre-determined dimensions. These pads can then, for example, be used to control the areas of catalyst deposition on the interlayer to ultimately control defined areas on the substrate where CNT growth is initiated.

In one embodiment of the present invention, the resist material is a photoresist material suitable for use with any photolithography method. Photolithography can include masking techniques and other techniques, such as mirrored laser illumination. As one example, a photoresist material is a viscous polymer resin (solution) containing some photochemically active polymer (PAC), which is typically rendered insoluble or soluble, relative to a wash solution, by exposure to light. Using a photoresist, a selected pattern can be imaged on a substrate. Areas of a negative photoresist not exposed to electromagnetic radiation may be removed by a washing process. Alternatively, a positive photoresist method may be employed, wherein only the areas of the photoresist material that have been exposed to electromagnetic radiation are removed by washing. As examples, a liquid resist such as is used in semiconductor manufacture or a film resist such is used in the manufacture of printed circuit boards may be used for this purpose.

FIGS. 2A-2G illustrate a portion of one embodiment of a process to form a patterned array of a plurality of CNT structures using lithography. First, the metal interlayer 104 is formed on the substrate 102. Second, a resist layer 202 is formed on the exposed surface of the interlayer and the resist layer is patterned using, for example, a mask and exposing the resist layer to, for example, a UV light source. The resist layer 202 is treated to remove, for example, the exposed portions of the resist layer 204. Next, a catalytic outerlayer is formed on exposed surfaces 104(a) of the non-catalytic interlayer 104 to form plurality of catalytic outerlayer pads 206. The remaining resist layer 202 is then removed. During the removal of the remaining resist layer 202, the catalytic outerlayer pads 206 are then subjected to an ultrasonication and exposure to water step.

This ultrasonication and exposure to water step includes subjecting the outerlayer pads 206 to ultrasonication (i.e., acoustic waves generated from an ultrasonic apparatus). For example, the whole substrate 102, including resist layer 202 and outerlayer pads 206, is immersed into a liquid bath. Examples of the liquid bath include an aqueous-based resist developer solution and a solvent-based resist remover solution. One example of an acceptable solution includes dimethyl sulfoxide (DMSO). The substrate 102/bath system, including outerlayer pads 206, is then subjected to ultrasonication for a time period ranging from 5-40 minutes. Preferably, this time period is 7-15 minutes, more preferably 9-11 minutes, and most preferably 10 minutes.

After the completion of the ultrasonication, the outerlayer pads 206 are exposed to water. Examples of processes of exposing the outerlayer pads 206 to water include rinsing, spraying, and dipping, to name a few. Preferably, the water used is deionized (DI) water. For example, DI with a resistivity of 18.2 MΩ·cm may be used. The outerlayer pads 206 are then dried using an air jet.

Figure 3A:
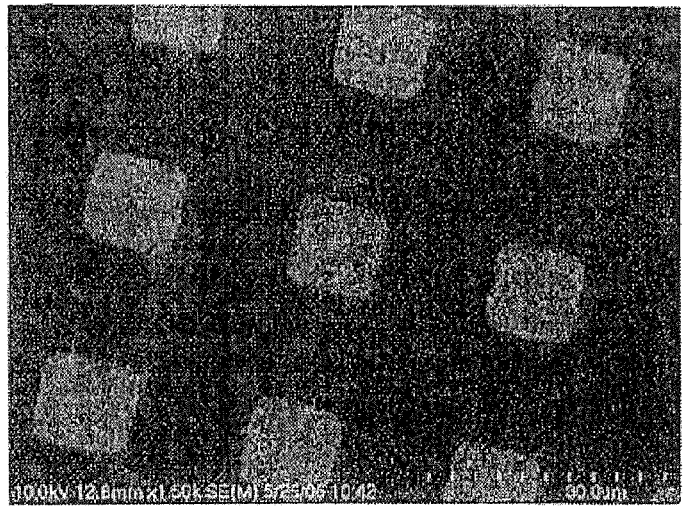
FIGS. 3A and 3B are images of nanotubes grown in the conventional manner.
Figure 3B:
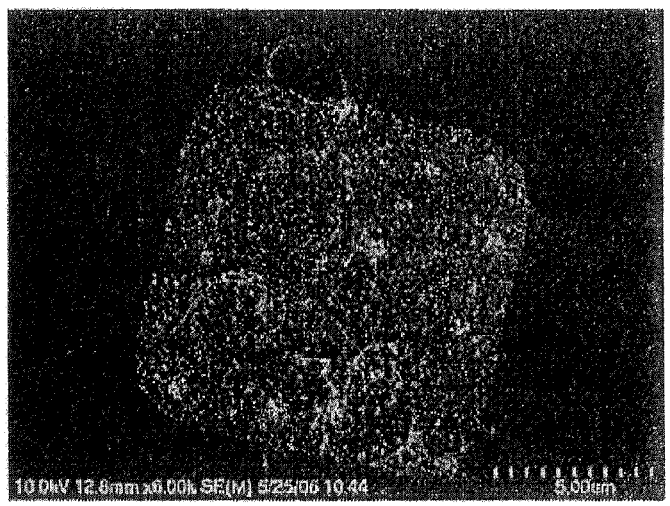
Figure 4A:
FIGS. 4A and 4B are images of nanotubes grown in accordance with an embodiment of the current invention.
Figure 4B:
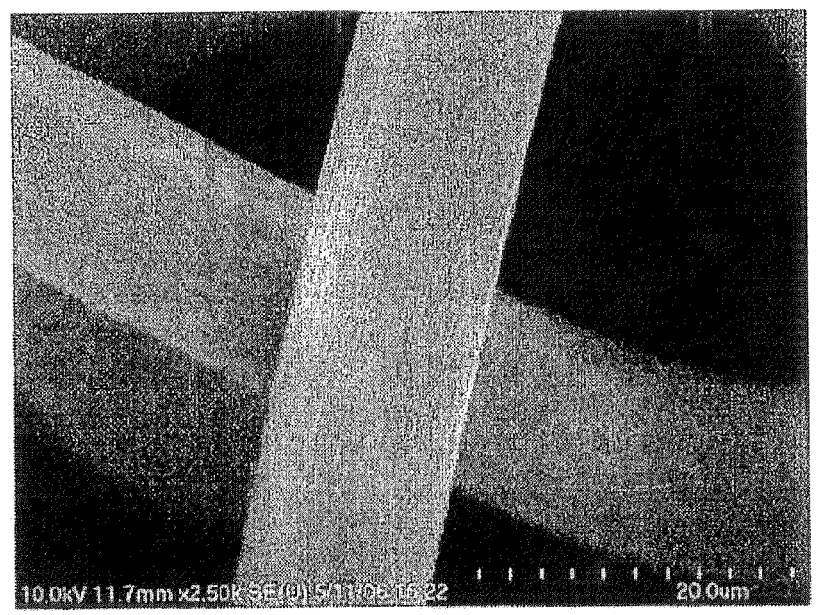

FIGS. 3A and 3B are images of nanotubes grown in the conventional manner, without the above described ultrasonication and exposure to water step. FIGS. 4A and 4B are images of nanotubes grown in accordance with an embodiment of the current invention, including the above described ultrasonication and exposure to water step. As can be seen, the sample produced in accordance with the current invention (FIGS. 4A and 4B) resulted in an average increase in the length of the nanotubes by a factor of 15.

In the above ultrasonication and exposure to water step, the outerlayer pads 206 are first subjected to ultrasonication and then exposed to water. However, the current invention is not limited thereto. For example, after remaining resist layer 202 is removed, the outerlayer pads 206 can be exposed to water and then subjected to ultrasonication. Another example involves using water as the solution in which the outerlayer pads 206 are ultrasonicated, thereby simultaneously ultrasonicating the outerlayer 106 and contacting it with water. Yet another example involves ultrasonicating the outerlayer 106 in an aqueous solution.

Following the ultrasonication and exposure to water step, the catalyst/substrate material is treated to form a plurality of CNT structures 108 onto the surface of the plurality of catalytic outerlayer pads 206. Alternatively, the plurality of CNT structures 108 can be formed on the plurality of outerlayer pads 206 prior to the removal of the remaining resist layer 202. In such a case, the ultrasonication and exposure to water step would occur both before the plurality of CNT structures 108 are formed and before the removal of the remaining resist layer 202.

In an alternative embodiment, the resist material is deposited on the surface of the substrate prior to the deposition of the interlayer onto the surface of the substrate. The resist layer is aligned with a mask with an appropriate pattern and the exposed areas of the resist layer are treated with, for example, a UV light source. The resist layer is then developed and the exposed areas removed to provide a pattern of negative pads with pre-determined dimensions, where the substrate surface is exposed. The non-catalytic metal layer and catalyst layer are then deposited on the exposed substrate surface. Finally, the remaining resist layer is removed through etching, and the catalyst layer is subjected to the above described ultrasonication and exposure to water step. The final product has interlayer/outerlayer pads over a uniform and continuous substrate surface.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for fabricating a plurality of carbon nanotube structures, the method comprising:
   providing a substrate;

forming a non-catalytic metal layer on the substrate, where the non-catalytic metal layer is formed to have a thickness of from about 0.6 nm to about 2.0 nm;
forming a catalytic metal layer on the non-catalytic metal layer;
depositing and patterning a layer of a resist material for forming a pattern in the catalytic metal layer;
removing the remaining resist material the pattern in the catalytic metal layer is formed;
subjecting the catalytic metal layer to an ultrasonication and exposure to water step, the ultrasonication and exposure to water step comprising:
submerging the catalytic metal layer in a liquid bath;
generating micro-defects, cavities, or a combination thereof in the catalytic metal layer by ultrasonicating the catalytic metal layer and the liquid bath; and
exposing the catalytic metal layer to water; and
after the ultrasonication and exposure to water step, forming the plurality of carbon nanotube structures on the substrate in the presence of the catalytic metal layer,
wherein the ultrasonication and exposure to water step is a step that is separate from the remaining resist removing step and occurs after the remaining resist material removing step and immediately prior to the carbon nanotube forming step.

2. The method of claim 1, wherein the catalytic metal layer is ultrasonicated before the catalytic metal layer is exposed to water.

3. The method of claim 2, wherein the catalytic metal layer is exposed to deionized water.

4. The method of claim 1, wherein the catalytic metal layer is exposed to water before the catalytic metal layer is ultrasonicated.

5. The method of claim 1, wherein the liquid bath is an aqueous solution.

6. The method of claim 1, wherein the liquid bath is water, and wherein the catalytic metal layer is simultaneously ultrasonicated and contacted with water.

7. The method of claim 1, wherein the liquid bath is a non-aqueous solution.

8. The method of claim 1, wherein the liquid bath includes an alcohol.

9. The method of claim 1, wherein the liquid bath includes dimethyl sulfoxide.

10. The method of claim 1, wherein the catalytic metal layer is ultrasonicated for a time period ranging from 5 to 40 minutes.

11. The method of claim 1, wherein the catalytic metal layer is ultrasonicated for a time period ranging from 7 to 15 minutes.

12. The method of claim 1, wherein the catalytic metal layer is ultrasonicated for a time period ranging from 9 to 11 minutes.

13. A method for fabricating a plurality of carbon nanotube structures, the method comprising:
providing a substrate;
forming a non-catalytic metal layer on the substrate, where the non-catalytic metal layer is formed to have a thickness of from about 0.6 nm to about 2.0 nm;
performing a catalytic metal layer pad forming step comprising:
depositing a layer of a resist material on the non-catalytic metal layer;
patterning the resist layer;
according to the pattern, removing a portion of the resist layer from the underlying non-catalytic metal layer so as to expose a portion of the non-catalytic metal layer; and
forming a catalytic metal layer on the exposed portion of the non-catalytic metal layer;
removing the remaining resist material after the catalytic metal layer pad forming step;
subjecting the catalytic metal layer to an ultrasonication and exposure to water step, the ultrasonication and exposure to water step comprising:
submerging the catalytic metal layer in a liquid bath;
generating micro-defects, cavities, or a combination thereof in the catalytic metal layer by ultrasonicating the catalytic metal layer and the liquid bath; and
exposing the catalytic metal layer to water; and
after the ultrasonication and exposure to water step, forming the plurality of carbon nanotube structures on the substrate in the presence of the catalytic metal layer;
wherein the ultrasonication and exposure to water step occurs after the catalytic metal layer pad forming step, and
wherein the ultrasonication and exposure to water sten is a step that is separate from the remaining resist removing step and occurs after the remaining resist material removing step and immediately prior to the carbon nanotube forming step.

14. A method for fabricating a plurality of carbon nanotube structures, the method comprising:
providing a substrate;
performing a catalytic metal layer pad forming step comprising:
depositing a layer of a resist material on the substrate;
patterning the resist layer; and
according to the pattern, removing a portion of the resist layer from the underlying substrate so as to expose a portion of the substrate;
forming a non-catalytic metal layer on the exposed portion of the substrate, where the non-catalytic metal layer is formed to have a thickness of from about 0.6 nm to about 2.0 nm; and
forming a catalytic metal layer on the non-catalytic metal layer;
removing the resistant material remaining after the catalytic metal layer pad forming step;
subjecting the catalytic metal layer to an ultrasonication and exposure to water step, the ultrasonication and exposure to water step comprising:
submerging the catalytic metal layer in a liquid bath;
generating micro-defects, cavities, or a combination thereof in the catalytic metal layer by ultrasonicating the catalytic metal layer and the liquid bath; and
exposing the catalytic metal layer to water; and
after the ultrasonication and exposure to water step, forming the plurality of carbon nanotube structures on the substrate in the presence of the catalytic metal layer;
wherein the ultrasonication and exposure to water step occurs after the catalytic metal layer pad forming step, and
wherein the ultrasonication and exposure to water step is a step that is separate from the remaining resist removing sten and occurs after the remaining resist material removing step and immediately prior to the carbon nanotube forming step.

15. A method for fabricating a plurality of carbon nanotube structures, the method comprising:
providing a substrate;

forming a non-catalytic metal layer on the substrate;
forming a catalytic metal layer on the non-catalytic metal layer so that a ratio of a thickness of the non-catalytic metal layer to the catalytic metal layer is in a range of from about 1:1 to about 1:8;
depositing and patterning a layer of a resist material for forming a pattern in the catalytic metal layer;
removing the remaining resist material after the pattern in the catalytic metal layer is formed;
subjecting the catalytic metal layer to an ultrasonication and exposure to water step, the ultrasonication and exposure to water step comprising:
   submerging the catalytic metal layer in a liquid bath;
   generating micro-defects, cavities, or a combination thereof in the catalytic metal layer by ultrasonicating the catalytic metal layer and the liquid bath; and
   exposing the catalytic metal layer to water; and
after the ultrasonication and exposure to water step, forming the plurality of carbon nanotube structures on the substrate in the presence of the catalytic metal layer,
wherein the ultrasonication and exposure to water step is a step that is separate from the remaining resist removing sten and occurs after the remaining resist material removing step and immediately prior to the carbon nanotube forming step.

16. A method for fabricating a plurality of carbon nanotube structures, the method comprising:
providing a substrate;
forming a non-catalytic metal layer on the substrate;
performing a catalytic metal layer pad forming step comprising:
   depositing a layer of a resist material on the non-catalytic metal layer;
   patterning the resist layer;
   according to the pattern, removing a portion of the resist layer from the underlying non-catalytic metal layer so as to expose a portion of the non-catalytic metal layer; and
   forming a catalytic metal layer on the exposed portion of the non-catalytic metal layer so that a ratio of a thickness of the non-catalytic metal layer to the catalytic metal layer is in a range of from about 1:1 to about 1:8;
removing the remaining resist mater after the catalytic metal layer pad forming step;
subjecting the catalytic metal layer to an ultrasonication and exposure to water step, the ultrasonication and exposure to water step comprising:
   submerging the catalytic metal layer in a liquid bath;
   generating micro-defects, cavities, or a combination thereof in the catalytic metal layer by ultrasonicating the catalytic metal layer and the liquid bath; and
   exposing the catalytic metal layer to water; and
after the ultrasonication and exposure to water step, forming the plurality of carbon nanotube structures on the substrate in the presence of the catalytic metal layer;
wherein the ultrasonication and exposure to water step occurs after the catalytic metal layer pad forming step, and
wherein the ultrasonication and exposure to water step is a step that is separate from the remaining resist removing step and occurs after the remaining resist material removing step and immediately prior to the carbon nanotube forming step.

17. A method for fabricating a plurality of carbon nanotube structures, the method comprising:
providing a substrate;
performing a catalytic metal layer pad forming step comprising:
   depositing a layer of a resist material on the substrate;
   patterning the resist layer; and
   according to the pattern, removing a portion of the resist layer from the underlying substrate so as to expose a portion of the substrate;
   forming a non-catalytic metal layer on the exposed portion of the substrate; and
   forming a catalytic metal layer on the non-catalytic metal layer so that a ratio of a thickness of the non-catalytic metal layer to the catalytic metal layer is in a range of from about 1:1 to about 1:8;
removing the resistant material remaining after the catalytic metal layer pad forming step;
subjecting the catalytic metal layer to an ultrasonication and exposure to water step, the ultrasonication and exposure to water step comprising:
   submerging the catalytic metal layer in a liquid bath;
   generating micro-defects, cavities, or a combination thereof in the catalytic metal layer by ultrasonicating the catalytic metal layer and the liquid bath; and
   exposing the catalytic metal layer to water; and
after the ultrasonication and exposure to water step, forming the plurality of carbon nanotube structures on the substrate in the presence of the catalytic metal layer;
wherein the ultrasonication and exposure to water step occurs after the catalytic metal layer pad forming step, and
wherein the ultrasonication and exposure to water step is a step that is separate from the remaining resist removing step and occurs after the remaining resist material removing step and immediately prior to the carbon nanotube forming step.

* * * * *